United States Patent [19]

Maillet

[11] 3,878,339

[45] Apr. 15, 1975

[54] REFERENCE STATION FAILURE IN A TDMA SYSTEM

[75] Inventor: Wilfrid G. Maillet, Oxon Hill, Md.

[73] Assignee: Communications Satellite Corporation, Washington, D.C.

[22] Filed: Dec. 18, 1973

[21] Appl. No.: 425,762

Related U.S. Application Data

[63] Continuation of Ser. No. 143,180, May 13, 1971, abandoned, which is a continuation of Ser. No. 866,629, Oct. 15, 1969, abandoned.

[52] U.S. Cl. ............ 179/15 BS; 325/4; 343/100 ST

[51] Int. Cl. ............................................. H04j 3/06

[58] Field of Search ............... 325/2, 3, 4, 156, 157, 325/158, 58; 343/100 ST, 7.5; 179/15 AL, 15 BA, 15 BS

[56] References Cited

UNITED STATES PATENTS

| | | | |
|---|---|---|---|
| 2,597,043 | 5/1952 | Treadwell | 325/2 |
| 3,418,579 | 12/1968 | Hultberg | 325/4 |
| 3,564,545 | 2/1971 | Gottlieb | 343/7.5 |
| 3,683,116 | 8/1972 | Dill | 325/4 |

*Primary Examiner*—Kathleen H. Claffy
*Assistant Examiner*—Thomas D'Amico
*Attorney, Agent, or Firm*—Alan J. Kasper; James W. Johnson, Jr.

[57] ABSTRACT

In a time division, multiple access communications system comprising a plurality of earth stations and a satellite transponder, the timing of transmitter turn-on at each station is important to insure that the transmission bursts from the various stations do not overlap in time at the satellite. A burst synchronization mechanism at each station maintains the transmission burst in the proper position with respect to a reference station burst. If, for any reason, the reference station fails, this is detected by all other stations. The station whose burst directly follows the reference burst takes over the reference station function, and the burst times of all other station bursts are resynchronized with respect to the new reference burst.

7 Claims, 4 Drawing Figures

PATENTED APR 15 1975 3,878,339

SHEET 1 OF 2

INVENTOR
WILFRID G. MAILLET

BY Sughrue, Rothwell, Mion, Zinn & Macpeak
ATTORNEYS

REFERENCE STATION FAILURE IN A TDMA SYSTEM

This is a continuation of application Ser. No. 143,180, filed May 13, 1971, now abandoned, which is a continuation of application Ser. No. 866,629, filed Oct. 15, 1969, now abandoned.

BACKGROUND OF THE INVENTION

With the advent of commercial satellite communications, it was a natural choice to employ, for satellites, the same type of techniques and equipment which have served so well across the decades for terrestrial links. However, as satellite technology has progressed, it has become increasingly clear that the conventional frequency-division mode of multiple-access (FDMA) operation has a number of disadvantages; major problem areas are in the generation of intermodulation noise in the satellite transponder, the need for accurate up-power control among network stations, and the general inflexibility of FDMA frequency-allocation plans. A study of alternative approaches to FDMA communications rapidly focused attention on the possibilities afforded by time-division multiple-access (TDMA) systems in which stations communicate with each other by means of non-overlapping burst transmissions. Because only one carrier signal is being received by the satellite transponder at any instant, intermodulation noise and power control difficulties are eliminated.

A major requirement for TDMA systems is the synchronization of the transmission bursts so that they will be non-interfering even though the earth stations are located such that differences in the propagation delay time between various earth stations and a single satellite may be as much as 15 milliseconds. When a station first turns on, it has a burst acquisition problem, i.e., it must properly insert its transmission burst into the time frame so that it does not interfere with the bursts of the other operating stations. One technique for controlling burst acquisition is described in U.S. Patent application of John G. Puente, Ser. No. 594,830, filed Nov. 16, 1966, now U.S. Pat. No. 3,530,252 entitled, "Acquisition Technique for TDMA Satellite Communication System," and assigned to the assignee of the present invention. Initial acquisition is not the subject of the present invention. Initial acquisition is not the subject of the present application.

During normal operation after acquisition, since the satellite does not maintain a perfectly constant position, the relative delay times between each earth station and the satellite varies. Also, the propagation delay time differences between various earth stations differs. Thus, it is necessary to maintain a continuous check on burst positions at each station and to perform corrections when necessary. A method and apparatus for performing the burst synchronization operation is described in U.S. Patent application of Ova G. Gabbard, Ser. No. 594,921, filed Nov. 16, 1966, now U.S. Pat. No. 3,562,432, entitled "Synchronizer for Time Division Multiple Access Satellite Communication System," and assigned to the assignee of the present invention, and in Mr. Gabbard's paper entitled "Design of a Satellite Time Division Multiple Access Burst Synchronization," appearing in IEEE *Transactions On Communications Technology*, Volume COM-16, No. 4, August, 1968, pp. 589–596.

The burst synchronization apparatus described in the Gabbard application and publication operates by comparing the time at which a reference burst, or a burst from a reference station, is received with the time at which the local station burst is received. If the time difference is not the same as a predetermined correct time separation a correction is made to the local station burst. Obviously, in the absence of some corrective action, failure of the reference station to continue to transmit its burst of data will result in loss of synchronization for the entire system. It is to this problem of failure of the reference station that the present invention is directed.

SUMMARY OF THE INVENTION

In accordance with the present invention, in normal operation the reference station sends out an indication of the fact that it is the reference station and all other stations monitor the reference station indication. If, for some reason, the reference station goes off the air or has a failure, the lack of the reference indication will be sensed by all other stations in the system. If the reference indication is missing for a preset period of time, the station which occupied the second position in the time frame relative to the reference station, i.e., burst B, takes over the function of the reference station by transmitting a reference station indication during its own burst.

Once the station whose burst was in position B takes over the reference function, each of the remaining earth stations synchronizes its own burst transmission time with respect to the new reference burst. Although it is not necessary that a reallocation of satellite channels be accomplished at the same time that the stations synchronize their bursts with respect to the new reference, it is preferred that channel reallocation be carried out simultaneously since the channels previously allocated to the former reference station may be available for distribution among the other earth stations. Also, in the detailed description herein the invention is described as operating in conjunction with a reallocation system which combines the functions of synchronizing on a new reference and reallocating the satellite channels.

Although the apparatus for performing reference station take-over in accordance with the present invention cooperates with the burst synchronization apparatus and the reallocation apparatus, since the burst synchronizer and reallocation apparatus are described in copending applications, only so much of the burst synchronizer and reallocation apparatus as is necessary for a complete understanding of the present invention will be described herein. The burst synchronizer is described in detail in the application and publication of Gene Gabbard mentioned above. One system for performing reallocation is described and claimed in the U.S. Patent application of William G. Schmidt, Ser. No. 809,340, filed Mar. 21, 1969, now U.S. Pat. No. 3,644,678, entitled "Channel Reallocation System" and assigned to the assignee of the present invention and another is described and claimed in the application of Wilfrid G. Maillet, entitled "Variable Burst Length TDWA System" filed on the same date herewith and assigned to the assignee of the present invention.

TDMA DESCRIPTION OF THE DRAWINGS

DETAILED DESCRIPTION OF THE DRAWINGS

Figure 2:
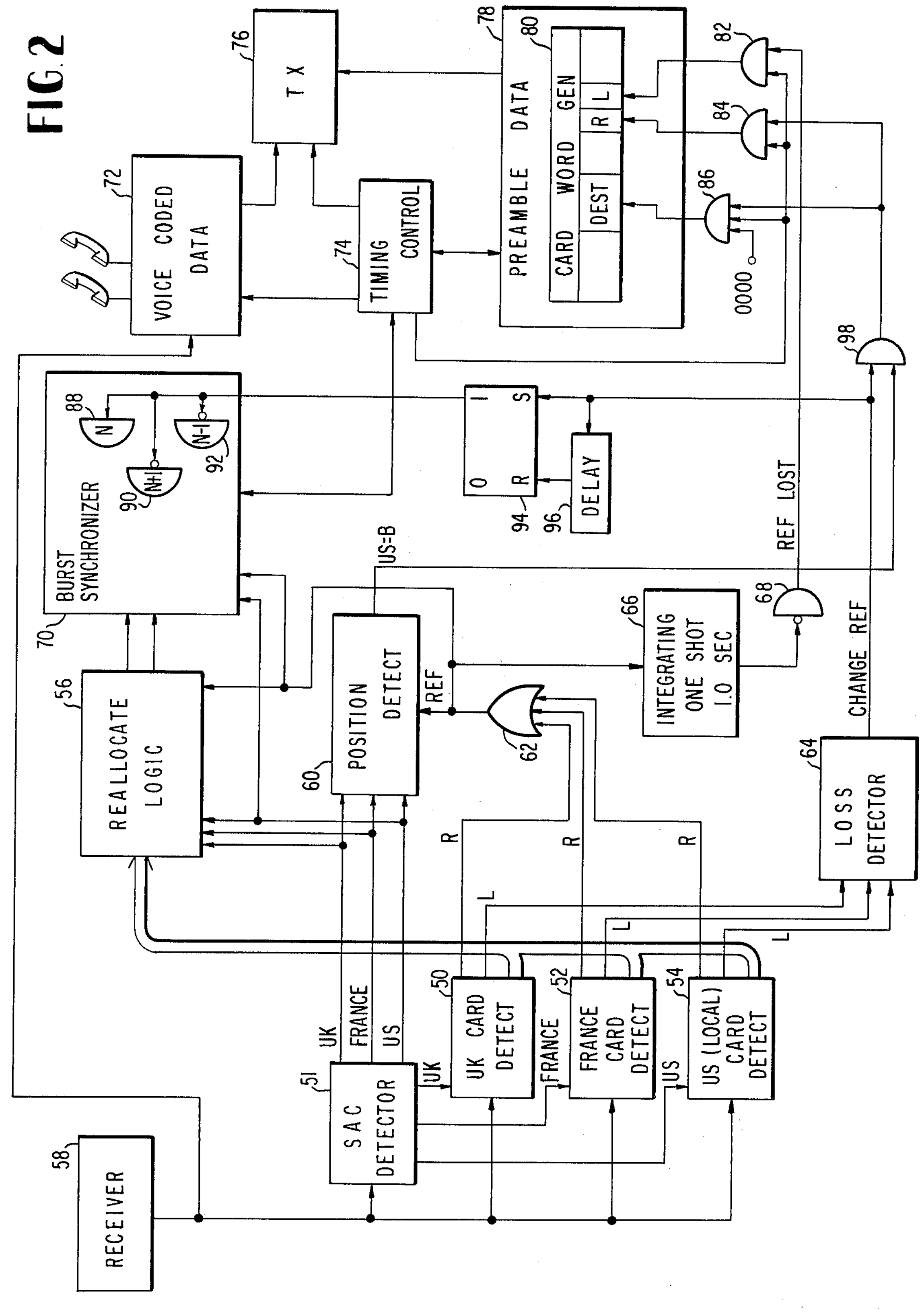
FIG. 2 is a block diagram of a preferred embodiment of the present invention.

For the purpose of aiding in the discussion of the present invention, it will be assumed that the overall system includes only three stations, located within and referred to respectively as France, U.S. and the United Kingdom (UK); France is initially the reference station and the sequence of bursts in the time frame is France—Burst A, U.S.—Burst B, and UK—Burst C. The apparatus shown in FIG. 2 is assumed to be located at the U.S. station (local station) but it will be apparent that the same apparatus is located at all of the stations.

Figure 1:
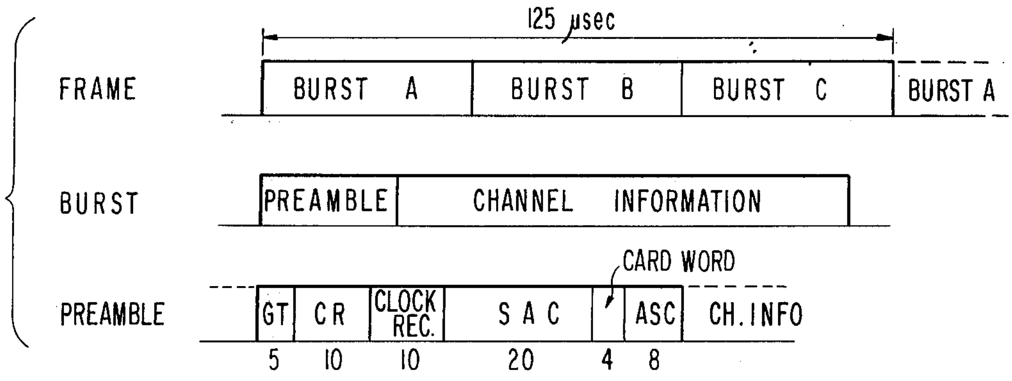
FIG. 1 illustrates the frame, burst, and preamble formats for a TDMA satellite communications system.

Referring now to the frame format shown in FIG. 1, it is seen that during the 125 microsecond frame period, each station transmits a single burst of data, and if properly synchronized, the bursts do not overlap at the satellite. As mentioned above, burst A is from France, burst B from the U.S. and burst C from the United Kingdom. The burst from any station includes a preamble followed by voice channel information. The area occupied by voice channel information is actually subdivided into voice channel slots, each channel representing a single conversation. In a typical TDMA format, each voice channel is eight bits in length, an eight bit word representing a single digitally coded voice sample. If the overall system operated at a clock rate of 50 kilobits per second, corresponding to 20 nanoseconds per bit, each channel slot would occupy 160 nanoseconds of the overall burst. It is thus apparent that many channels are included in each burst.

The preamble of a burst is that portion which contains all of the signaling and data required for network synchronization and operation. The preamble is normally the first portion of a burst to be transmitted and may also be defined as that part of a burst which is not the voice channel information. The first part of any preamble is the guard time GT, which is a period of non-transmission deliberately inserted between bursts to prevent their accidental overlapping. Such overlapping could occur because of tolerance variations in the system, uncertainties in synchronization technique, or simply transients associated with carrier switching. In the system under discussion, the guard time is determined by the burst synchronization technique and the asynchronous clocks used by individual stations. A guard time of 100 nanoseconds, corresponding to five bits, is considered adequate. The carrier recovery portion of the preamble constitutes a time during which the carrier is transmitted unmodulated and this aids the receiver in locking onto the carrier frequency and phase. The clock recovery portion of the preamble occupies ten bit times and comprises the carrier modulated by the clock pulses for the purpose of allowing the receiver to properly synchronize clock timing. The next 20-bit word in the preamble is the station address code (SAC) which identifies the sender station. Thus, all bursts from the U.S. would contain a SAC word identifying the U.S.

The SAC word is followed by four bits of channel allocation and routing data (CARD). The entire CARD word is 32 bits in length but is submultiplexed across eight frames at four bits per frame. Thus, the receiver extracts the four bits in the CARD word slot from eight successive bursts for the same station thereby reconstructing the entire CARD Word. The CARD word contains the information required in assigning channel links between the stations. The information part of the CARD word is 21 bits in length, with an error detection code of 10 bits tacked onto the end of the 21 data bits. An additional dummy bit is added to form a 32 bit word so that the CARD word can be submultiplexed evenly across eight frames. Typically, a BCH (31,2121) error detecting code will guarantee the detection of any word with four or less bits in error.

The 21 bits of information in the CARD word include a four bit destination slot and a nine bit channel number slot. For example, if channel number 5 is selected for transmitting a conversation from station A to station C, the burst from station A contains an identification of station C in the destination slot of the CARD word and the number 5 in the channel number slot of the CARD word. This informs the station C that the information contained in the fifth channel slot of the station A burst is addressed to it.

As described in detail in the copending application of Wilfrid G. Maillet, mentioned above, the destination slot and the channel number slot of the CARD word are also used to initiate the reallocation process and to carry certain reallocation information to all of the stations in the network. As described in the latter application, the code 0000 appearing in the four-bit destination slot of the CARD word informs all stations that reallocation is to be accomplished. The code 1111 in the four bit destination slot signifies that the number in the nine-bit channel slot represents the highest numbered channel presently in use by the sending station. All of this information is used to reposition the bursts during reallocation.

The last region of the preamble is taken up by an eight bit word called the access service circuit which is normally used as an interstation voice conference line.

In accordance with the present invention, two onebit slots of the CARD word are used for the purposes of identifying the reference station and identifying the loss of a reference station. For example, the presence of a one bit in the 20th bit position of the CARD word indicates that the transmitting station is the reference station, whereas a zero in the 20th bit position of the CARD word indicates that the transmitting station is not the reference station. A one bit in the 21st bit position of the CARD word indicates that the transmitting station has lost the reference station whereas a zero bit in the 21st bit position of the CARD word indicates that the transmitting station has not lost the reference station.

Figure 3:
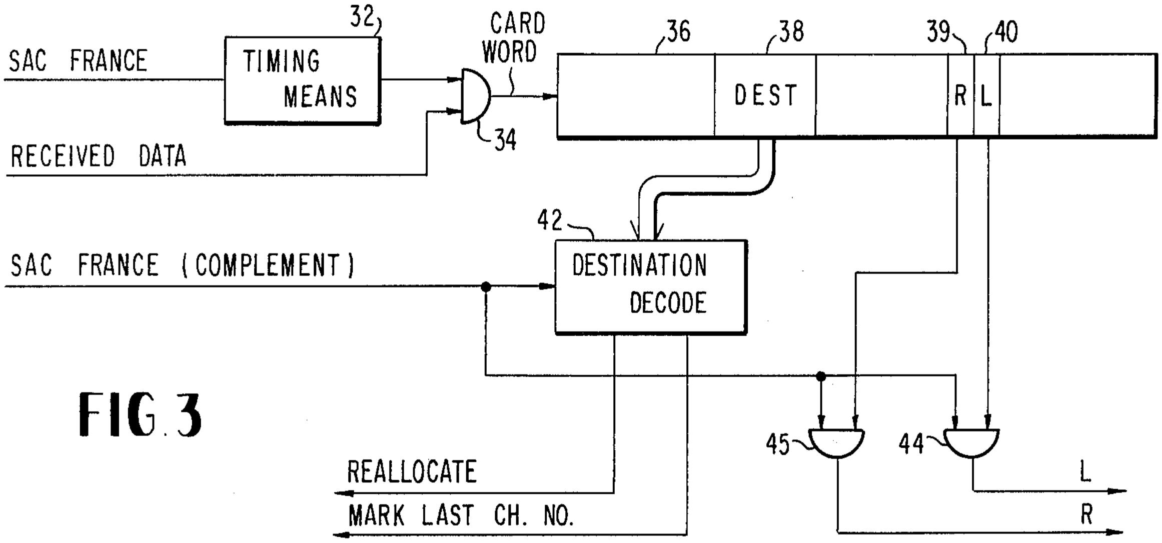
FIG. 3 is a block diagram of a CARD word detector useful in the apparatus shown in FIG. 2.

An example of logic applicable for detecting the data contained in a CARD word is illustrated in FIG. 3. Each local station, e.g., the U.S. Station, contains logic capable of detecting the CARD word from all stations invloved in the involved including the local station itself. The logic shown in FIG. 3 is assumed to be at the U.S. station and is further assumed to be be the logic for detecting the France CARD word. It also should be noted that every eighth burst transmitted by any given station contains the SAC word in its complement form. Thus, whenever the complement of the SAC word arrives that indicates the start of a new 32 bit CARD word.

Whenever the receiver detects the SAC word representing France, a timing means 32 is initiated to thereby provide energization of an AND circuit 34. The timing means operates to energize AND circuit 34 for an 80 nanosecond period (corresponding in time to the four bit CARD word) following the SAC word. Consequently, the four bit CARD word data is extracted from the received data and entered into a CARD word shift register 36. After eight full bursts, the CARD word will be completely reconstructed in register 36 with the destination code appearing in destination slot 38, a reference station indication appearing in slot 39, and a lost reference station indication appearing in slot 40. Additional data contained in the CARD word is not illustrated because it is not important for an understanding of the present invention. the When the word is completely reconstructed in shift register 38, the succeeding burst from the same station will be the complement of the SAC word. The latter indication energizes a destination decode circuit 42 and the AND circuits 44 and 45, all of which effectively read out certain information from the CARD word shift register 36. At the time of energization, if the destination slot 38 contains the code 0000, the destination decode circuit 42 provides an output on the reallocate output line. If the destination slot 38 contains the code 1111, the destination decode circuit 42 provides an output on the MARK last channel number output line. The latter two output lines operate the reallocation logic mentioned above. If France is the reference station, slot 39 will contain a one bit and consequently at read out time, there will occur an output from AND circuit 45 indicating the receipt of a burst from the reference station. Under normal operation, the lost reference slot 40 will contain a zero bit and therefore the output from AND circuit 44 will not indicate a loss of the reference station. The manner in which the R and L slots of the CARD word are filled will be described hereinafter. It should be noted that readout could be accomplished even if the system did not operate with the complement SAC word being sent out every eighth frame. The SAC word indication could be applied to a counter which provides an output every eighth count, the latter output initiating readout.

Referring now to the apparatus shown in FIG. 2, each of the CARD detectors 50, 52, and 54 performs the logic operations described in connection with FIG. 3. Thus, the UK CARD detector 50 has an R output, and an L output. The additional data detected by the CARD detectors is shown as being lumped together and applied to the reallocate logic apparatus 56.

Before describing the subject matter of the invention which operates to detect the failure of a reference and to reassign the reference station operation to another station, a general description of the overall system environment with which the invention is associated will be given. A receiver 58 receives the information transponded from the satellite and sends that digitally coded information to a system 72 which operates to extract the voice channel information, decode it and connect it to the proper subscriber line. The system 72 also operates to encode input voice information from the subscriber line and send the encoded voice information to the transmitter 76. A timing control means 74 controls the transmission such that the encoded voice data, as well as the preamble information, is properly positioned within the station burst. The timing control 74 responds to the output from a burst synchronizer 70 to start its timing function for the present burst. The burst preamble is assembled in preamble data logic 78 and sent to the transmitter 76 under control of timing means 74. The preamble data logic 78 may include a CARD word generator 80 which contains the channel allocation and routing data mentioned above.

Although the burst synchronizer 70, per se, is not the subject of the present invention, and therefore will not be completely described in detail, it is intimately associated with the logic for controlling reference station failure and, therefore, certain aspects of the burst synchronizer 70 are summarized herein. In the burst synchronizer, the 50 kilobit per second clock pulses are applied to a counter/divider which operates to divide the clock pulses by the value N and provide an output for every N clock pulses. The output initiates the burst from the local station. In the case of a 125 microsecond frame, N would equal 6,250. The latter number corresponds to the number of clock pulses per frame. If the burst synchronizer detects that the local station burst is too close to the reference station burst, it energizes an N + 1 gate in the burst synchronizer which forces the counter/divider to divide by N + 1. This has the effect of delaying the burst 1 bit per frame for as long as the N + 1 gate is energized. If the burst synchronizer detects that the burst is too far from the reference and should be moved forward in time, an N-1 gate in the burst synchronizer is energized, thereby causing the counter/divider to divide by N-1. The result of a division by N-1 is to advance the burst 1 bit per frame for as long as the N = 1 gate is energized. If the burst synchronizer detects that the local burst is properly timed, the N gate is energized resulting in the counter/divider dividing by N. The burst synchronizer detects whether or not the local burst is properly positioned, early or late, by comparing the time difference of arrival of the reference SAC code and local station SAC code with a quantity held in the burst synchronizer delay counter. The quantity held in the burst synchronizer delay counter represents the proper separation between the reference and local station bursts.

The reallocation logic 56 operates as described in the above-mentioned copending Maillet application to alter the position of the local station burst by inserting a new quantity into the burst synchronizer delay counter.

In accordance with the present invention, each station monitors the presence of a one bit in the R slot of a CARD word. If no reference station indication is received for a full second, thereby indicating that the reference station went off the air or failed for some reason, the following takes place:

Each station immediately forces its respective burst synchronizer to divide by N, thus preventing any movement of its burst for a time sufficient to allow a new reference station to take over. The station whose burst was in the second position within the time frame inserts a one bit into the R slot of its CARD word thereby taking over the function of the reference station. The latter station also initiates channel reallocation by inserting the code 0000 into the four bit destination slot of its CARD word.

As shown in FIG. 2, the output data from receiver 58 is applied to CARD detectors 50, 52, and 54, and the SAC detector 51. The SAC detector 51 provides an output on the UK, France or U.S. output line in response to detection of the corresponding SAC words. The UK, France and U.S. outputs from SAC detector 51 gate the respective CARD words into CARD detectors 50, 52, and 54. As long as the reference burst is being received, there will be an R output from one of the CARD detectors at least once every frame. In the example described herein, with the assumption that France is the reference station, there will be an R output every 125 microseconds from CARD detector 52. The R output lead lines are applied through an OR circuit 62 to a position detector 60, an integrating one-shot 66, the reallocate logic 56 and the burst synchronizer 70. The position detector 60 is a simple logic circuit which detects whether or not the U.S. burst is burst B.

Figure 4:
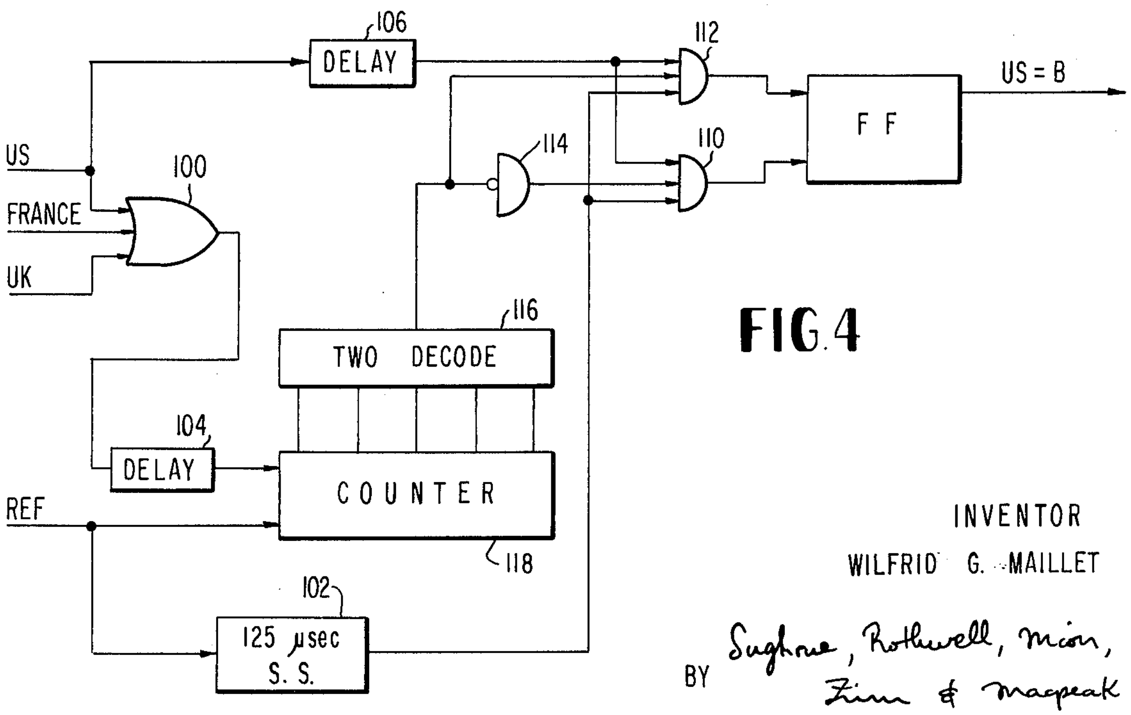
FIG. 4 is a block diagram of a position detector useful in the apparatus shown in FIG. 2.

The only function of the position detect logic 60 is to provide a flag or signal if the local station is in position B in the burst. An example of logic capable of detecting whether or not the local station (U.S.) transmits burst B is shown in FIG. 4, now described.

The output pulses from SAC detector 51 are applied through an OR circuit 100 and delay means 104 to the input of a counter 118. The reference pulse from OR circuit 62 (FIG. 2) is applied to the reset input of counter 118. Delay means 104 provides a very small delay between input and output sufficient to insure that the signal representing the SAC detection of the reference burst follows in time the reference pulse. Thus, the counter registers the count of one in response to the reference SAC detection, two in response to burst B SAC detection, three in response to burst C SAC detection, etc.

The U.S. detection signal is applied via a delay means 106 to a pair of AND circuits 112 and 110. Delay means 106 provides a slightly longer than delay means 104 to insure that the counter has settled prior to the U.S. SAC detection signal being applied to the AND circuits. A two-decode circuit 116 provides an output to AND circuit 112 when the counter 118 registers a count of two and, via an invert circuit 114, applies an output to AND circuit 110 whenever the counter does not register a count of two. The output of AND circuit 112 sets a flip flop 108, and the output AND circuit 110 resets flip flop 108. The output of flip flop 108, when in the SET condition, indicates that the local station burst is in the B position of the frame.

If, as in the example hypothesized, the U.S. station is in position B, the counter will register the count of two at the time that the output of delay 106 is applied to AND circuits 114 and 110. Consequently, flip flop 108 will be set and will remain in the SET condition until such time as the burst from the U.S. station occupies a different position. A 125 sec single shot 102, having its output connected to AND circuits 112 and 110 insures that the state of flip flop 108 is not altered when the reference pulse is lost.

In the assumed example, the U.S. burst is in position B. The integrating one-shot 66 (FIG. 2) has a one second timing period. Thus, as long as a full second does not elapse between adjacent reference indications, the output of the integrating one-shot will remain up and the output from an invert gate 68 connected thereto will remain down. However, if the reference indication is not received for a full second, the output from integrating one-shot 66 will go down, causing a reference loss indicaiton to appear at the output of invert gate 68. When the latter condition occurs, and at the time for constructing the CARD word, as controlled by timing control means 74, a one bit is passed through the AND circuit 82 and inserted into the L slot of the CARD word. As pointed out above, a one bit in the L slot indicates that the reference station has been lost. Consequently, all CARD words transmitted by the U.S. station will indicate the loss of the reference station until such time as a new reference station takes over. The L outputs from CARD word detectors 50, 52 and 54 are applied to a loss detector 64 which operates to provide a change reference output when at least two of the station CARD words indicate a loss of reference. It will be noted that if only one station's CARD word indicates a loss of reference, the loss is probably due to an error in the monitoring station rather than a failure of the reference station.

The change reference indication operates in all stations to force the burst synchronizer to divide by N. This is accomplished by the setting of a flip flop 94 whose output inhibits the N + 1 and N − 1 gates in the burst synchronizer 70 and energizes the divide by N gate 88 in burst synchronizer 70. Until the flip flop is reset, the burst synchronizer will continue to divide by N resulting in no change of position of the local station burst. The change reference indication may be applied to a delay circuit 96 which delays the input an amount of time approximately equal to twice the rounf trip time to the satellite. The purpose of the delay is to allow sufficient time for a reallocation marker to be transmitted to all stations (one round trip time) and for all stations to transmit data required for the reallocation operation (second round trip time).

In the station occupying position B, the change reference indication from the loss detector 64 passes through an AND circuit 98 and is applied to AND circuits 84 and 86. AND circuit 84 operates to insert a one bit into the reference slot of the CARD word whereas AND circuit 86 operates to put the code 0000 into the destination slot. The result is that the station which was previously in the second position now becomes the reference station and, at the same time, a reallocation code is sent out. As a result of the latter described operation, all stations will now synchronize their bursts on the new reference burst.

What is claimed is:

1. In a TDMA system having multiple stations and a frame format comprising one burst of transmitted data from each operating station in a non-overlapping sequence, a burst from a single station in the sequence being designated the reference burst, a method for preventing failure of system synchronization as a result of loss of a reference indication, said method at a local station comprising, a. monitoring bursts received from all stations to detect the presence of a reference signal identifying one of the received bursts as a reference burst, b. transmitting, during the local station burst time, a "lost" signal identifying that the reference station is lost when said reference signal has not been detected for a preset time period, c. monitoring bursts received from all stations to detect the presence of "lost" signals, and d. preventing any alteration of the local station burst transmit time relative to the other stations for a period of time following detection of "lost" signals in a predetermined number of received bursts.

2. The method as claimed in claim 1 further comprising, a. monitoring said received bursts to detect whether or not the local station burst occupies the second position within the frame relative to the reference burst, and b. transmitting a reference signal identifying said local station as the reference station following detection of "lost" signals in a predetermined number of received bursts and detection of said local station burst as occupying said second position within the frame.

3. The method as claimed in claim 2 further comprising, a. transmitting a pre-established code signal to cause all stations to resynchronize their bursts on the local station burst, said code signal being transmitted following detection of "lost" signals in a predetermined number of received bursts and detection of said local station burst as occupying said second position within the frame.

4. In a TDMA system having multiple stations and a frame format comprising one burst of transmitted data from each operating station in a non-overlapping sequence, a burst from a single station in the sequence being the reference burst, apparatus for preventing failure of system synchronization as a result of loss of a reference indication, said apparatus at a local station comprising, a. reference signal monitoring means for monitoring bursts received from all stations to detect the presence of a reference signal identifying one burst as a reference burst, b. means, connected to said monitoring means, for transmitting, during the local station burst time, a "lost" signal identifying that the reference station is lost when said reference signal has not been detected for a preset time period, c. "lost" signal monitoring means for monitoring bursts received from all stations to detect the presence of "lost" signals, and d. means, connected to said "lost" signal monitoring means, for preventing any alteration of the local station burst transmit time for a period of time, in response to the detection of "lost" signals in a predetermined number of received bursts.

5. The apparatus as claimed in claim 4 further comprising, a. position detection means for monitoring said received bursts to detect whether or not the local station burst occupies the second position within the frame relative to the reference burst, and b. means, connected to said position detecting means, for transmitting a reference signal identifying said local station as the reference station in response to the detection of "lost" signals in a predetermined number of received bursts and detection of said local station burst as occupying said second position within the frame.

6. The apparatus as claimed in claim 5 further comprising, a. means, connected to said position detection means, for transmitting a pre-established code signal to cause all stations to resynchronize their bursts on the local station burst in response to the detection of "lost" signals in a predetermined number of received bursts and detection of said local station burst as occupying the second position within the frame.

7. In a TDMA communications system having multiple transmit/receive stations, a satellite transponder serving as a communication link for said stations, wherein each station transmits one burst of data per frame synchronized with respect to one said burst identified as a reference burst, the method of preventing failure of system synchronization as a result of loss of a reference indication, said method comprising, a. monitoring, at all stations, all received bursts for the presence of a reference signal identifying that the burst containing the reference signal is the reference burst, b. transmitting a "lost" signal from each station, during each said station's burst, which has not detected the presence of a reference signal for a predetermined time period, c. monitoring, at all stations, all received bursts for the presence of "lost" signals, and d. preventing alteration of the burst transmit time with respect to all other bursts at each station at which lost signals were detected in a predetermined number of monitored bursts.

* * * * *